United States Patent
Baldwin

(10) Patent No.: US 7,453,368 B2
(45) Date of Patent: Nov. 18, 2008

(54) SURGE PROTECTOR LIFE CYCLE MONITOR SYSTEM AND METHOD

(75) Inventor: John R. Baldwin, Newtown, CT (US)

(73) Assignee: Hubbell Incorporated, Orange, CT (US)

( * ) Notice: Subject to any disclaimer, the term of this patent is extended or adjusted under 35 U.S.C. 154(b) by 347 days.

(21) Appl. No.: 11/354,230

(22) Filed: Feb. 15, 2006

(65) Prior Publication Data

US 2007/0188962 A1   Aug. 16, 2007

(51) Int. Cl.
*G08B 21/00* (2006.01)

(52) U.S. Cl. .................. 340/659; 340/657; 340/635; 361/117; 361/118; 338/21

(58) Field of Classification Search .............. 340/635, 340/657, 659; 361/117, 118; 338/21
See application file for complete search history.

(56) References Cited

U.S. PATENT DOCUMENTS

| | | | |
|---|---|---|---|
| 4,210,906 A * | 7/1980 | Smith et al. | 340/659 |
| 4,774,510 A | 9/1988 | Steinke | |
| 5,105,371 A | 4/1992 | Shaw et al. | |
| 5,185,705 A | 2/1993 | Farrington | |
| 5,390,065 A | 2/1995 | Allina et al. | |
| 5,428,494 A | 6/1995 | Ahuja | |
| 5,748,093 A * | 5/1998 | Swanson et al. | 340/659 |
| 5,790,359 A | 8/1998 | Kapp et al. | |
| 5,914,662 A * | 6/1999 | Burleigh | 340/635 |
| 6,161,077 A | 12/2000 | Fawcett | |
| 6,424,927 B1 | 7/2002 | Sechi et al. | |
| 6,535,369 B1 | 3/2003 | Redding et al. | |
| 6,614,636 B1 | 9/2003 | Marsh | |
| 6,756,907 B2 | 6/2004 | Hollaway | |
| 6,807,035 B1 | 10/2004 | Baldwin et al. | |
| 6,879,478 B2 * | 4/2005 | Mendoza et al. | 361/93.1 |
| 2004/0216530 A1 | 11/2004 | Kwon | |

* cited by examiner

*Primary Examiner*—Jeff Hofsass
*Assistant Examiner*—Kerri L McNally
(74) *Attorney, Agent, or Firm*—Stacey J. Longanecker; Mark S. Bicks; Alfred N. Goodman

(57) ABSTRACT

A system and method are provided for determining an expected life of an electric surge protection component. The system and method monitors preferably each surge that an electric surge protection component experiences. Each surge is measured to determine magnitude and duration, and a cumulative surge measurement history is maintained for each component. Based upon an analysis of the cumulative surge measurement history, an expected life of the component is determined, and an end user is alerted at or preferably near an end of the expected life of the device.

12 Claims, 4 Drawing Sheets

(a)

(b)

(a)

(b)

SURGE PROTECTOR LIFE CYCLE MONITOR SYSTEM AND METHOD

BACKGROUND OF THE INVENTION

1. Field of the Invention

The present invention relates to a system and method for monitoring surge protectors. More specifically, the present invention relates to a system and method for monitoring each surge experienced by a surge protector, such as a metal oxide varistor (MOV), and generating a cumulative history to determine the remaining life of the protector.

2. Description of the Related Art

Surge suppressors include any number of devices that are designed and positioned in an electrical circuit to protect sensitive electronic and electrical equipment from high energy voltage transients. As known to those skilled in the art, many electrical devices are susceptible to high voltage surges, and accordingly, surge suppressors are provided to protect the devices from the harm that such surges can cause. Surge suppressors themselves can be comprised of a number of configurations, for example, inductor/capacitor networks, avalanche diodes, and so forth. However, these devices vary in speed, size, cost effectiveness, and energy handling capability.

Metal oxide varistors (MOVs) and silicon avalanche diodes (SADs) are two devices which are frequently used because they have exceptional speed, size, cost effectiveness, and energy handling capabilities. However, MOVs tend to wear down with each transient voltage event until they eventually fail. When either of these devices fails, there can be potentially deleterious results.

The most common method of controlling the potentially deleterious results of a suppressor failure is to place a fuse in series with the suppressor. The fuse is positioned and configured to open the circuit of the surge suppressor when the suppressor conducts a high current for long periods of time. Various methods of detecting that the fuse is blown are then used to provide a warning signal to the user that the suppressor is no longer functioning properly.

Another conventional method of controlling the potentially deleterious results of a suppressor failure incorporates a low melting point solder that eventually melts due to the heat generated by the failing suppressor. When the solder melts, the suppressor circuit is interrupted, thereby disconnecting the failed suppressor. However, under some circumstances, the solder will not melt quickly enough and significant heat, smoke and possible explosion can be produced during the delay. Further, this method does not react to high currents quickly. This results in the requirement of an additional fuse for this purpose, which increases expense and consumes space.

These conventional methods of detecting failures of suppressors have a major drawback in that they only alert a user of a failure of the suppressor, and do not provide indication of remaining suppressor service life. In doing so, after the suppressor fails, the load has no protection from high voltage transients. Many users of surge suppression devices do not often check their surge suppressors, thereby further extending the periods wherein the load is not protected from transient voltages. During these periods, the system is unprotected and the probability of failure of the load increases dramatically. Accordingly, there has been a need for systems and methods for the improved detection of suppressor failures.

One method of detecting when the load is close to being unprotected from high voltage transients is to have several suppressors connected in parallel with one another, wherein each parallel suppressor includes a fusing element. This method subjects every suppressor in the device to every high voltage transient that is on the line. The device detects when each suppressor fails and then indicates that the load is getting close to being unprotected by the reduced number of suppressors still functioning properly. This method is effective at giving early indication of the cumulative failure of a plurality of suppressors. However, there are drawbacks to this method besides the additional cost of using plural suppressors, fuses and detection circuits. Because the suppressors are in parallel and all are subjected to high voltage transients, all of the components are degraded together. This means that the amount of remaining protection available is variable and it is difficult to predict when the load will become unprotected. Further, this method is most effective with a plurality of suppressors, and is not suited for giving an early indication of the failure of a single suppressor.

Still other methods provide additional visual indications. For example, such a technique is disclosed by U.S. Pat. No. 5,748,093, to Swanson et al., and related U.S. Pat. No. 5,790,359, to Kapp et al., the entire disclosure of both being incorporated herein by reference. The above patents each disclose a surge protection system having a means for generating a visual indication of the level of surge protection, taking into account measured voltage values. The '093 and '359 patents disclose a means for sensing and storing data relating to voltage conditions in a nonvolatile memory, and determining an amount of surge protection remaining based on voltage readings. Specifically, in an example where a surge protector module includes four surge protection devices, a weighted average voltage is calculated and compared with four separate threshold values. The comparison is used to provide an output indication of a percentage surge protection remaining (that is, 100% where all four devices are functioning, 75% where three are functioning, 50% where two are functioning, and 0% where none are functioning) for the module via a display window. However, as with other conventional methods, this method is most effective with a plurality of suppressors and is not suited for giving an early indication of the failure of a single suppressor.

The above conventional methods are typically limited to determining if the continuity of an element such as a fuse, is intact or broken due to device failure, and notice is provided to a user regarding the status. Estimations of "remaining suppressor protection" is limited to cases wherein a plurality of suppressors exist and failures of each are detected.

Accordingly, a need exists for a system and method for effectively and efficiently estimating remaining suppressor protection levels in cases of even single devices, wherein values can be determined without reaching a point of suppressor failure.

SUMMARY OF THE INVENTION

Therefore, an object of the present invention is to substantially solve the above and other problems, and provide a system and method for effectively and efficiently estimating remaining suppressor protection levels in cases of even single devices, wherein values can be determined without reaching a point of complete suppressor failure.

Another object of the present invention is to provide a system and method for providing an apparatus that monitors and measures preferably each surge that a surge protection component experiences to determine current magnitude and current duration thereof, and generates a cumulative surge measurement history for each component for analysis to determine an expected life of the component. The apparatus then alerts an end user at or preferably near the end of the expected life of the component.

Another object of the present invention is to provide a system and method wherein the surge measurement history is maintained in a database and is compared with recent values. Prediction variables, such as voltage reductions between the surge measurement history and recently measured values, are then used in a technique to determine an expected life of the component, and an end user is alerted at or preferably near the end of the expected life of the component.

Another object of the present invention is to provide a system and method for measuring surge currents and MOV voltages under surge, and accumulating a data history of each that is then used in a technique to determine an expected life of the component.

Another object of the present invention is to provide a system and method that allows the replacement of failing surge protection devices prior to complete failure in response to an alert provided at or preferably near the end of the expected life of the surge protection devices.

Another object of the present invention is to provide a system and method that includes this ability in a cost-effective manner for commercial and industrial receptacle surge protection devices.

These and other objects of the present invention are substantially achieved by providing a system and method for determining an expected life of an electric surge protection component, and alerting an end user at or preferably near the end of the expected life of the component. In particular, the system and method monitors preferably each surge that an electric surge protection component experiences. Each surge is measured to determine current magnitude and current duration, and a cumulative surge measurement history is maintained for each component. Prediction variables, such as voltage reductions between the surge measurement history and recently measured values, can then be used in an analysis to determine the expected life of the component. Based upon the analysis of the cumulative surge measurement history, an expected life of the component is determined, and an end user is alerted at or preferably near an end of the expected life.

BRIEF DESCRIPTION OF THE DRAWINGS

The various objects, advantages and novel features of the preferred embodiments of the present invention will be more readily appreciated from the following detailed description when read in conjunction with the appended drawings, in which.

Figure 1:
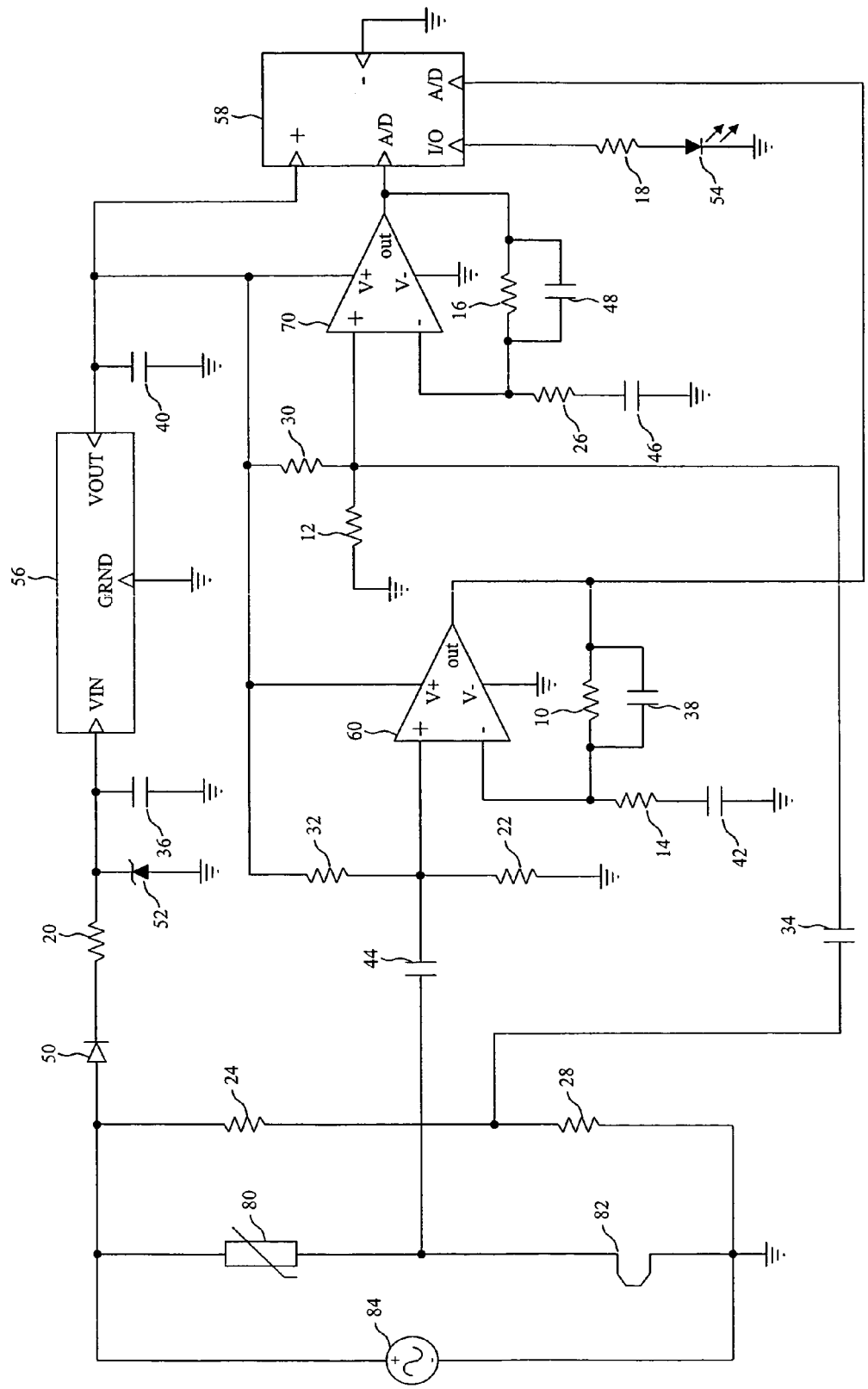
FIG. 1 is a schematic diagram illustrating an exemplary embodiment of the present invention.

DETAILED DESCRIPTION OF THE
EXEMPLARY EMBODIMENTS

The present invention comprises a system and method for measuring preferably each surge that a surge protection component experiences to determine current magnitude and current duration. As the values are measured, the system and method generates a cumulative surge measurement history for each component for analysis. Based upon the analysis of the cumulative surge measurement history, the system and method determines an expected life of the component, and an end user is alerted at or preferably near an end of the expected life of the component. Prediction variables, such as voltage reductions between the surge measurement history and recently measured values, can be used in the analysis to determine the expected life of the component.

Specifically, in accordance with an embodiment of the present invention, the effective life of a surge suppression device, such as an MOV, can be determined using a combination of measured surge current amplitudes and duration. As noted above, MOVs and similar devices tend to wear down with each transient voltage event until they eventually fail. NEMA and ANSI/IEEE standards specify typical surge source waveforms, but do not specify joule ratings because energy absorption characteristics of a surge protection device are best defined and evaluated using data, for example, "Maximum Surge Current Capability" data, as provided for a typical MOV device as illustrated in Table 1, by way of example. Hence, a typical MOV manufacturer's supplied data can include the following exemplary values of Table 1. The following data are examples of values for a MOV manufactured by Maida Development Co., of Hampton, Va.

TABLE 1

| Maximum Number Of Impulses | Surge Current For Maximum Number Of Impulses MOV: 20 mm, 250 VAC Impulse Width = 30 us | Surge Current For Maximum Number Of Impulses 8 us/20 us current impulses at a 1 minute impulse repetition rate | Surge Current For Maximum Number Of Impulses 10 us/1000 us current impulses at a 1 minute impulse repetition rate | Surge Voltage For Surge Current MOV: 20 mm, 250 VAC 8 us/20 us pulse impulses |
|---|---|---|---|---|
| 1 | 6,300 A | 10,000 A[5,300 A] | 300 A[135 A] | 1200 V |
| 2 | 4,700 A | 7,300 A | 240 A | 910 V |
| 10 | 2,400 A | 3,700 A[3,100 A] | 160 A[90 A] | 880 V |
| 100 | 950 A | 1200 A[1300 A] | 81 A[53 A] | 730 V |
| 1,000 | 400 A | 530 A[680 A] | 42 A[32 A] | 660 V |

TABLE 1-continued

| Maximum Number Of Impulses | Surge Current For Maximum Number Of Impulses MOV: 20 mm, 250 VAC Impulse Width = 30 us | Surge Current For Maximum Number Of Impulses 8 us/20 us current impulses at a 1 minute impulse repetition rate | Surge Current For Maximum Number Of Impulses 10 us/1000 us current impulses at a 1 minute impulse repetition rate | Surge Voltage For Surge Current MOV: 20 mm, 250 VAC 8 us/20 us pulse impulses |
|---|---|---|---|---|
| 10,000 | 150 A | 200 A[205 A] | 22 A[20 A] | 610 V |
| 100,000 | 96 A | 73 A[130 A] | —[11 A] | 580 V |
| 1,000,000 | 25 A | 30 A[66 A] | —[7.2 A] | 530 V |

Other factors should also be considered. Pulse shape, for example, comparing column three for 8 us/20 us impulses with column four for 10 us/1000 us impulses, makes a significant difference in the current values which can be tolerated by a MOV for a given maximum number of impulses.

Such surges can result from any number of sources, such as lightning. The following lightning parameters are disclosed in the text "Advanced Protection Technologies—Technical Reference 96-01", at page 2, and entitled "Facts About Lightning: Some Of The Physics And Effects Of A Lightning Strike", the relevant disclosure of which is incorporated herein by reference. As noted by the reference, 80% of lightning strikes are 2 or more strokes (impulses). Additionally, 50% of lightning strikes are 5-6 strokes (impulses), and the time between strokes (impulses) can vary from 100 us to 10,000 us.

In the conventional MOV, surge protection ratings drop to 60% to 75% of the maximum rating for each multiple stroke (impulse) lightning strike. This is due to the fact that the temperature rises to 800° C. to 1000° C. for example, in isolated hot spots in the MOV volume, resulting in failures from punctures of the zinc oxide material.

Additional complexities are introduced when other sources, such as internal building impulses due to motors, generators and other types of equipment, are considered. In consideration of all the various sources, UL 943 device tests, for example, require 6,000V-500A, and 6,000V-3,000A surge tests. These requirements are derived from ANSI/IEEE 62.41 and correspond to maximum levels based on "medium exposure". Category B3 Ringwave (6,000V, 500A) and Category B3 Impulse (6,000A, 3,000A) levels are lower than those required (Category C) for the building service entrance, and are for devices within the building.

In accordance with an embodiment of the present invention, a system and method can be provided wherein MOV current and current duration are measured and mapped or converted into an equivalent number of 8 us/20 us impulses. Additional details of mapping values are disclosed in Maida Catalog page 13, entitled "Peak Current Rating As A Percentage Of Single Pulse (8×20 us) Value vs. Pulse Duration". The cumulative elapsed "MOV Life" can then be accumulated in terms of the equivalent number of 8 us/20 us impulses. The number of variables involved in this technique, as well as the limited accuracy resulting from these variables and the significant test data that would need to be generated, make this approach not entirely cost-effective for a commercial or industrial receptacle surge protection device.

A more cost-effective and preferred alternate approach according to exemplary embodiments of the present invention is to provide a system and method to measure the MOV clamp voltages when impulses occur. Some leading sources consider a surge protection device to have failed when the clamp voltage is below 10% of the initial clamp voltage. As MOVs degrade, the clamp voltage decreases because less metal oxide substrate is available in the MOV. Eventually, a degraded MOV will try to clamp the peak of the normal sinusoid. When it does, it will typically go into thermal runaway, short circuit and then fail in an open state. A history of transient MOV voltages and coincident current impulses can be measured and retained in a memory. Peak line voltage measurements can be obtained using substantially the same circuit that is used to measure transient MOV voltages and current impulses. The values can be stored in a database and used by a microcontroller to generate a cumulative surge measurement history (for example, a rolling time window of history) for each component for analysis to determine an expected life of the component, and an end user can then be alerted at or preferably near an end of the expected life.

A current sensor (e.g., a Ragowski coil or current sensing shunt) can be provided to sense the transient currents through the MOV. Current sensor self-heating effects can be compensated for by the microcontroller through hardware or software used for analysis. A visual indicator, such as a steady green LED indication, can be provided to indicate power on and denote that the MOV is operating within a normal life cycle. When the MOV clamp voltage has degraded by, for example, a fixed number of increments of 10% or to within a percentage (e.g., 15%) of the line voltage peak, a flashing red LED can be provided to indicate that the MOV is at or near an end of life. In a similar fashion, a yellow LED can be provided and flashes when the MOV clamp voltage is within a percentage (e.g., 30%) of the line voltage peak.

FIG. 1 is a schematic illustrating an exemplary embodiment of the present invention for measuring and storing a history of transient MOV voltages and coincident current impulses in a memory. Peak line voltage measurements are obtained using substantially the same circuit that is used to measure transient MOV voltages and current impulses. The values are stored in a database and used by the microcontroller to generate a cumulative surge measurement history for the MOV to determine an expected life of the MOV.

The circuit of FIG. 1 comprises resistors 10 through 32, capacitors 34 through 48, and diodes 50 through 54. Diode 52 is provided as a Zener diode, and diode 54 is provided as a light emitting diode (LED) that can provide any of a red, green, or yellow signal, but is not limited thereto. The circuit of FIG. 1 further comprises a voltage regulator 56, a microcontroller 58, and amplifiers 60 and 70, wherein the LED 54 is electrically coupled between the microcontroller 58 and ground to provide a user alert as described in greater detail below.

The surge suppression device to be monitored in the exemplary embodiment is shown as varistor (MOV) 80. Although a varistor is shown, the present invention is not limited thereto. A current sensor 82 is electrically coupled in series with the MOV 80, and resistors 24 and 28 are electrically coupled in parallel with the MOV 80 and sensor 82 as a voltage divider. A voltage 84 (e.g., 120V) is also shown electrically coupled in parallel with the MOV 80 and the sensor 82, and can comprise any number of electrical sources from which surges can occur. The series coupling between the MOV 80 and the sensor 82 is electrically coupled to the noninverting (+) input terminal of amplifier 60 via capacitor 44. The series coupling between resistor 24 and resistor 28 is electrically coupled to the noninverting (+) input terminal of amplifier 70 via capacitor 34.

The amplifiers 60 and 70 comprise bandpass amplifiers, wherein the input of amplifier 60 is DC biased by resistors 22 and 32. The amplifier 60 is bandpass filtered by capacitor 38 in parallel with resistor 10, and capacitor 42 in series with resistor 14. The ground terminals V− of amplifiers 60 and 70 are electrically connected to circuit ground, and terminals V+ of amplifiers 60 and 70 are electrically coupled to the VOUT terminal of the voltage regulator 56, described in greater detail below.

The amplifier 70 is DC biased by resistors 12 and 30, and is bandpass filtered by capacitor 48 in parallel with resistor 16, and capacitor 46 in series with resistor 26. Further, the output terminal of amplifier 60 is electrically coupled to one of two A/D inputs of the microcontroller 58, and provides current peak and duration information to the microcontroller 58 as shown in greater detail in FIG. 2. The output terminal of amplifier 70 is electrically coupled to the second A/D input of the microcontroller 58, and provides voltage peak and duration information to the microcontroller 58 as shown in greater detail in FIG. 3. The I/O terminal of the microcontroller 58 is electrically coupled to the LED 54 via resistor 18. The microcontroller 58 is also electrically coupled to the regulator voltage (VOUT) terminal of voltage regulator 56. The VOUT terminal of the voltage regulator 56 is stabilized via capacitor 40.

The input voltage (VIN) terminal of the voltage regulator 56 is half-wave rectified by diode 50 and current limited by resistor 20. The input voltage (VIN) terminal of the voltage regulator 56 is input voltage limited by Zener diode 52 and filtered by capacitor 36. The ground (GRD) terminal of the voltage regulator 56 is electrically connected to circuit ground. In yet another embodiment of the present invention, amplifiers 60 and 70, and microcontroller 58 can be incorporated into a single PSOC chip.

Figure 4:
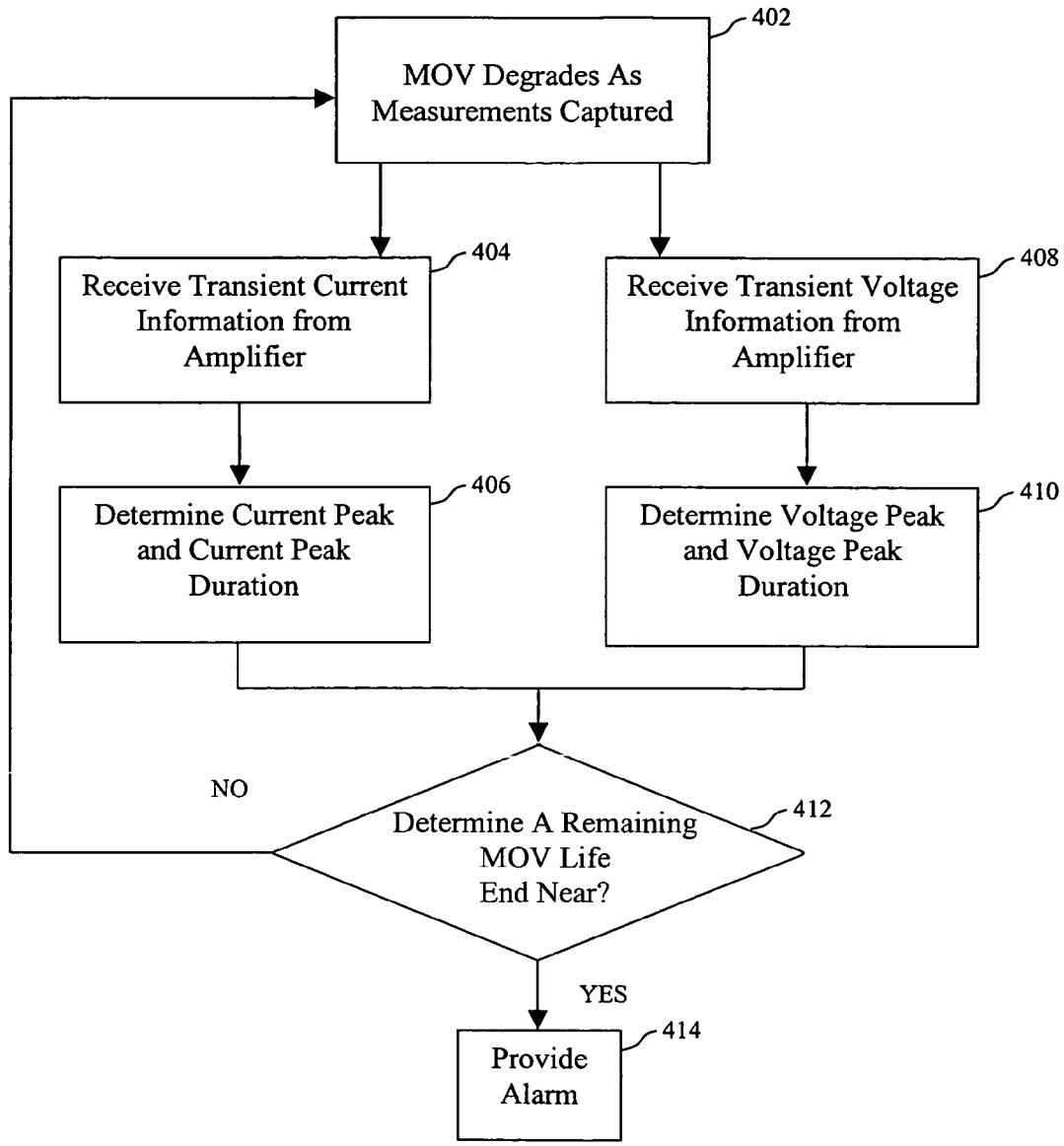
FIG. 4 is a flowchart illustrating an exemplary method for determining an expected life of an electric surge protection component and alerting an end user near the end of the expected life of the component in accordance with an exemplary embodiment of the present invention.

An exemplary operation of the circuit of FIG. 1 in accordance with an embodiment of the present invention will now be described in greater detail. FIG. 4 is a flowchart illustrating an exemplary method for determining an expected life of an electric surge protection component and alerting an end user at or near the end of the expected life of the component in accordance with an exemplary embodiment of the present invention. In FIG. 1, as the MOV 80 degrades, the clamp voltage decreases because less metal oxide substrate is available in the MOV 80. Eventually, the MOV 80 will try to clamp the peak of the normal sinusoid of the voltage 84. When it does, it will typically go into thermal runaway, short circuit, and then fail in an open state. In a first step 402, as the MOV 80 degrades, a history of transient MOV 80 voltages and coincident current impulses are measured and retained in a memory of the microcontroller 58 or a separately provided memory (not shown). To do so, the microcontroller 58 is provided inputs from the amplifiers 60 and 70.

Figure 2:
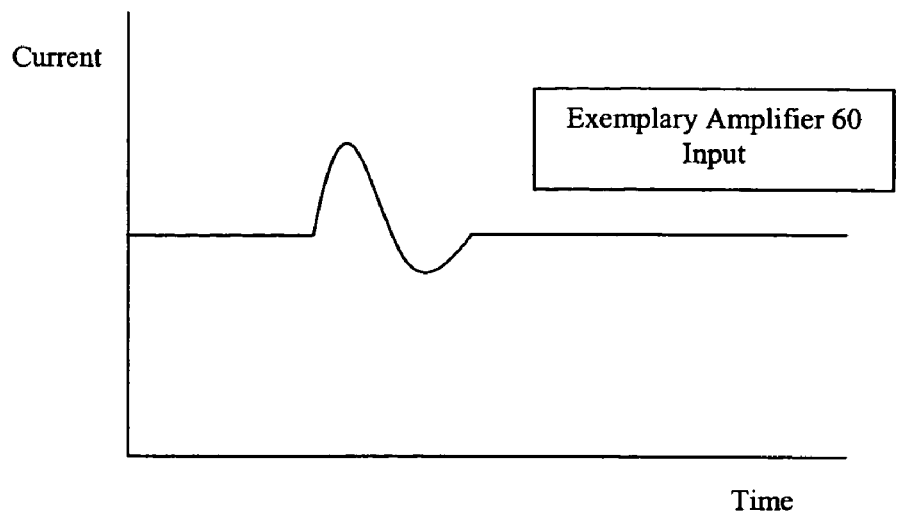
FIG. 2 is a plot illustrating examples of input and output signals of a first amplifier, wherein the input signal is a function of the MOV current in accordance with an exemplary embodiment of the present invention.
Figure 2:
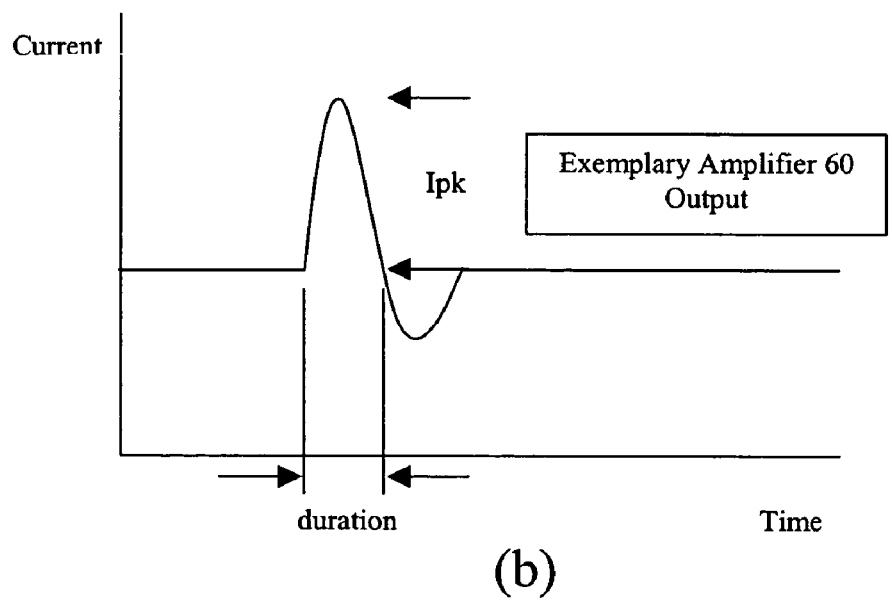

The voltage regulator 56 is a low dropout regulator, such as a MCP1700, manufactured by Microchip Technology, of Chandler, Ariz. The voltage regulator 56 VOUT supplies power to each of the amplifiers 60, 70 and the microcontroller 58. The amplifier 60 is coupled to one lead of the MOV 80, and outputs a signal to the microcontroller 58 in step 404 that is representative of the transient current passed by the MOV 80. As known to those skilled in the art, at low voltages, the MOV 80 has a high resistance. However, at or above clamping voltage values, the MOV 80 has a low resistance resulting in current flow detected by the amplifier 60, and which generates a signal input to the microcontroller 58. In FIG. 2, an example of input and output signals of the amplifier 60 are shown. In FIG. 2, an exemplary input signal at the noninverting (+) terminal of the amplifier 60 is shown at plot (a), and an output signal of the amplifier 60 is shown at plot (b). The output of plot (b) can then be used to determine the current peak (Ipk) and the current peak duration in step 406.

Figure 3:
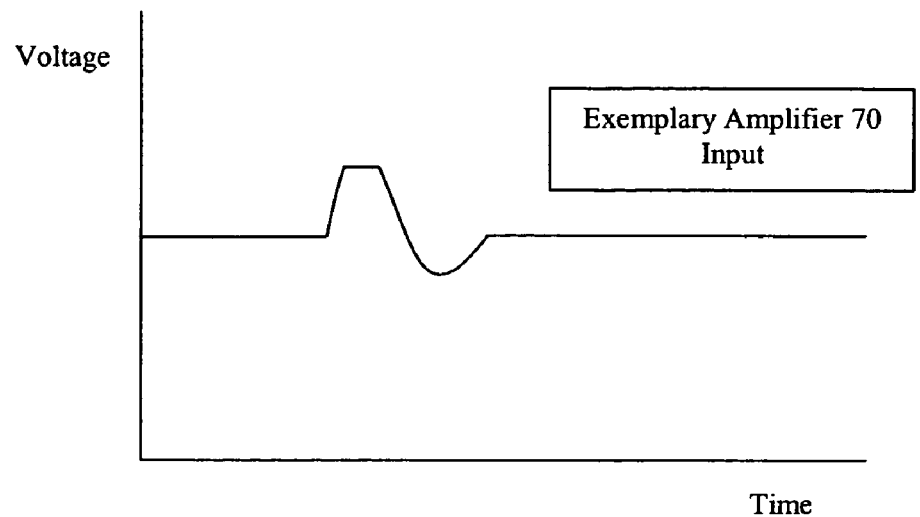
FIG. 3 is a plot illustrating examples of input and output signals of a second amplifier, wherein the input signal is a function of the applied line voltage in accordance with an exemplary embodiment of the present invention.
Figure 3:
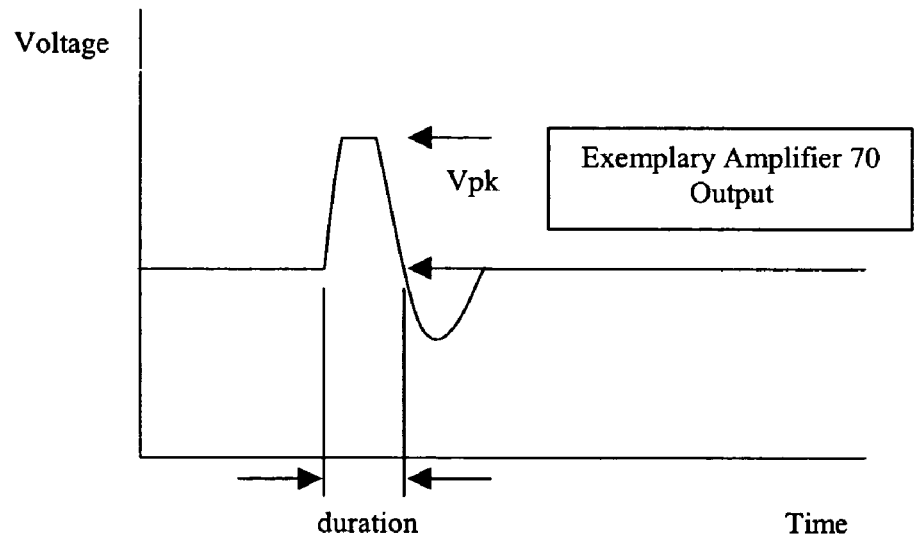

For comparison purposes, the voltage divider of resistors 24 and 28 provides a reduced amplitude replica of the line voltage transient to the amplifier 70 which generates a signal input to the microcontroller 58 in step 408 that is representative of the transient input signal levels. In FIG. 3, an example of input and output signals of the amplifier 70 are shown. These signals can be used to detect peak signal levels and duration. In FIG. 3, an exemplary input signal at the noninverting (+) terminal of the amplifier 70 is shown at plot (a), and an output signal of the amplifier 70 is shown at plot (b). The output of plot (b) can then be used to determine the clamped voltage peak (Vpk) and the voltage peak duration at step 410.

The microcontroller 58 receives the signals of amplifiers 60 and 70, and can therefore monitor preferably each surge experienced by the surge protector MOV 80. The microcontroller 58 can further be programmed to maintain a database comprised of preferably each surge experienced by the surge protector MOV 80, and can generate a cumulative history to determine the remaining life of the MOV 80 at step 412. Specifically, in step 412 the microcontroller 58 monitors preferably each surge that MOV 80 experiences. Each surge is measured to determine current magnitude and current duration, and a cumulative surge measurement history is maintained for the MOV 80. Voltage reductions between the surge measurement history and recently measured values are then used to determine the expected life of the MOV 80. If it is determined that the MOV 80 is near the end of an expected life, notice is provided at step 414. If it is determined that the MOV 80 is not near the end of an expected life, the method returns to step 402.

The hardware and/or software of the microcontroller 58 can be provided with any number of algorithms to generate warnings based on input values, and thereafter output signals to the LED 54 at step 414 such that a user is alerted at or preferably near an end of the expected life of the MOV 80. Specifically, the stored cumulative surge history can be compared with recently measured values at step 412 to determine a remaining life of the MOV 80. In yet other embodiments of the present invention, the microcontroller 58 can look for predetermined voltage reductions to determine if the MOV 80 is near the end of an expected life. In still other embodiments of the present invention, the microcontroller 58 can look for a specific count of input signals exceeding a threshold level to determine if the MOV 80 is near the end of an expected life.

As noted above, if it is determined that the MOV 80 is near the end of an expected life, notice is provided at step 414 to the LED 54. For example, one steady green LED indication can be used to indicate power on and that the MOV 80 is operating within the range of a normal life cycle. When the single MOV 80 clamp voltage has degraded to within 15% of the peak line voltage for example, a red LED indication can begin flashing to indicate that the MOV 80 is at or near an end of life. Additionally, when the single MOV 80 has experienced a predetermined number of defined surge levels, a red LED indication can begin flashing to indicate that the MOV 80 is at or near an end of life. As noted above, the peak line voltage measurements are available using the same circuit that is used to measure transient MOV 80 voltages and current impulses, hence typical and maximum line voltages can be determined and used with any number of suitable algorithms to determine the near end of life point of the MOV 80.

In yet another embodiment of the present invention, when the clamp voltage is at some percentage above AC line voltage peaks, a red LED indication can begin flashing. In yet another embodiment of the present invention, a yellow LED indication can be used to indicate the time between when the MOV 80 clamp voltage has degraded by some value, for example, 10%, and when the MOV 80 clamp voltage has degraded to some value above line voltage peaks. Obviously many other warning variations are possible to visually or audibly indicate where the product is in the MOV 80 life cycle.

In yet another embodiment of the present invention, the sensitivity of the current sensor 82 and the values of resistors 24 and 28 can be adjusted to provide signals to the microcontroller 58 directly, without requiring amplifiers 60 and 70.

While a number of exemplary embodiments have been chosen to illustrate the present invention, it will be understood by those skilled in the art that various changes and modifications can be made therein without departing from the scope of the invention as defined in the appended claims.

What is claimed is:

1. A method for monitoring surges experienced by a surge protector and generating a cumulative history to determine the remaining life of the protector, comprising the steps of:
   measuring a peak impulse level applied to at least one surge protector;
   measuring an impulse period of the measured impulse;
   storing measured peak impulse levels and impulse periods in a database; and
   determining an expected remaining life of the surge protector based upon an analysis of at least one of a present and stored measured peak impulse levels and impulse periods.

2. A method for monitoring surges experienced by a surge protector as claimed in claim 1, further comprising the steps of:
   comparing the determined expected remaining life of the surge protector with a first threshold value; and
   generating a warning when the surge protector has an expected remaining life less than the first threshold value.

3. A method for monitoring surges experienced by a surge protector as claimed in claim 1, further comprising the steps of:
   determining a present performance level of the surge protector and a previous performance level of the surge protector based upon an analysis of the present and stored measured peak impulse levels and impulse periods;
   comparing the present and previous performance levels of the surge protector to determine a performance level reduction; and
   generating a warning when the surge protector has a performance level that is reduced by a second predetermined value.

4. A method for monitoring surges experienced by a surge protector as claimed in claim 1, further comprising the steps of:
   determining a clamp voltage and a line voltage peak based upon an analysis of at least one of the present and stored measured peak impulse levels and impulse periods; and
   generating a first warning when the clamp voltage is at a third predetermined level above the line voltage peak.

5. A method for monitoring surges experienced by a surge protector as claimed in claim 4, further comprising the step of:
   generating a second warning to indicate a time period between when the clamp voltage has reduced by a fourth predetermined value and when the clamp voltage has reduced to the third predetermined level above the line voltage peak.

6. A method for monitoring surges experienced by a surge protector as claimed in claim 1, further comprising the steps of:
   generating a third warning to indicate that the surge protector has experienced a predetermined number of impulses.

7. An apparatus for monitoring surges experienced by a surge protector and generating a cumulative history to determine the remaining life of the protector, comprising:
   a first measurement element to measure a peak impulse level applied to at least one surge protector;
   a second measurement element to measure an impulse period of the measured peak impulse; and
   a microprocessor for storing measured peak impulse levels and impulse periods in a database and for determining an expected remaining life of the surge protector based upon an analysis of at least one of a present and stored measured peak impulse levels and impulse periods.

8. An apparatus for monitoring surges experienced by a surge protector as claimed in claim 7, further comprising:
   at least one warning element for alerting when the surge protector has an expected remaining life less than a first predetermined value.

9. An apparatus for monitoring surges experienced by a surge protector as claimed in claim 7, wherein the microprocessor is configured to:
   determine a present performance level of the surge protector and a previous performance level of the surge protector based upon an analysis of the present and stored measured peak impulse levels and impulse periods;
   compare the present and previous performance levels of the surge protector to determine a performance level reduction; and
   generate a warning when the surge protector has a performance level that is reduced by a second predetermined value.

10. An apparatus for monitoring surges experienced by a surge protector as claimed in claim 7, wherein the microprocessor is configured to:
    determine a clamp voltage and a voltage peak based upon an analysis of at least one of the present and stored measured peak impulse levels and impulse periods; and
    generate a first warning when the clamp voltage is at a third predetermined level above the voltage peak.

11. An apparatus for monitoring surges experienced by a surge protector as claimed in claim 10, wherein the microprocessor is configured to:
　　generate a second warning to indicate a time period between when the clamp voltage has reduced by a fourth predetermined value and when the clamp voltage has reduced to the third predetermined level above the line voltage peak.

12. An apparatus for monitoring surges experienced by a surge protector as claimed in claim 7, wherein the microprocessor is configured to:
　　generate a third warning to indicate that the surge protector has experienced a predetermined number of impulses.

\* \* \* \* \*